United States Patent [19]
Wolfman et al.

[11] Patent Number: 5,540,539
[45] Date of Patent: Jul. 30, 1996

[54] TRANSFER APPARATUS FOR MOVING A PERSON FROM A WHEELCHAIR INTO AN AUTOMOBILE

[76] Inventors: Paul R. Wolfman, 3822 Normandy, Royal Oak, Mich. 48073; Carlos R. Buck, 730 Second St., Pontiac, Mich. 48340

[21] Appl. No.: 370,016

[22] Filed: Jan. 9, 1995

[51] Int. Cl.⁶ .................................................. B60P 1/44
[52] U.S. Cl. ........................................ 414/541; 414/921
[58] Field of Search ................................. 414/540, 541, 414/543, 921, 744.3, 744.7

[56] References Cited

U.S. PATENT DOCUMENTS

| | | | |
|---|---|---|---|
| 2,930,499 | 3/1960 | Landen | 414/541 |
| 3,172,551 | 3/1965 | Wolfe | 414/921 X |
| 3,515,294 | 6/1970 | Southward et al. | 414/541 |
| 3,981,484 | 9/1976 | James | 414/921 X |
| 4,155,587 | 5/1979 | Mitchell | 414/921 X |
| 4,170,368 | 10/1979 | Southward et al. | 414/541 X |
| 4,457,663 | 7/1984 | Hems et al. | 414/921 X |
| 4,483,653 | 11/1984 | Waite | 414/541 |
| 5,308,214 | 5/1994 | Crain et al. | 414/541 |

*Primary Examiner*—David A. Bucci
*Attorney, Agent, or Firm*—John R. Benefiel

[57] ABSTRACT

A passenger transfer apparatus is disclosed for moving a person from a wheelchair into a passenger seat of an automobile, in which an elevator mechanism is mounted at the outer end of a swing arm pivotally mounted at the front of the passenger compartment alongside the door opening. An engagement element hooks a transfer seat as the elevator mechanism is operated allowing the swing arm to move the transfer seat over the passenger seat, and releases the same as the transfer seat is lowered onto the passenger seat.

6 Claims, 4 Drawing Sheets

TRANSFER APPARATUS FOR MOVING A PERSON FROM A WHEELCHAIR INTO AN AUTOMOBILE

FIELD OF THE INVENTION

This invention concerns automotive passenger entry assist apparatus, particularly for facilitating movement of a person from a wheelchair into an automobile passenger seat.

BACKGROUND OF THE INVENTION

There has long been recognized a need for apparatus assisting in the movement of a wheelchair-bound person into the passenger compartment of an automobile.

Many such devices have been designed for use with vans having large door openings, in which the person is lifted by means of a power screw mounted platform, which swings through the opening prior to being lowered within the vehicle.

See U.S. Pat. No. 4,306,634 issued on Dec. 22, 1981 for a "Lift Assembly" and U.S. Pat. No. 4,661,035 issued on Apr. 28, 1987 for a "Collapsible Wheel-Chair and Apparatus for Lifting the Wheel Chair Into and Out From an Automobile" for examples of such apparatus.

See also U.S. Pat. No. 5,112,076 issued on May 12, 1992 for a "Wheelchair with Removable Seat" and U.S. Pat. No. 4,551,060 issued on Nov. 5, 1985 for a "Device for Raising Various Loads, Particularly Trolleys for Handicapped Persons on Vehicles".

Such systems are too bulky for use with conventional vehicles. Vans are expensive and more difficult to maneuver, and many persons forced to use a wheelchair would prefer to be transported in a less obvious manner than in such a van. Hence it would be desirable to adapt such apparatus to a conventional sedan.

Attempts have heretofore been made to provide such apparatus adapted to the more compact confines of a sedan model car.

U.S. Pat. No. 4,457,663 issued on Jul. 3, 1984 describes apparatus which allows a wheelchair to be swung behind the steering wheel of an auto.

U.S. Pat. No. 4,278,387 issued on Jul. 14, 1981 describes a seat which is detachable from a wheelchair and slid on rails into the passenger compartment.

U.S. Pat. No. 4,170,368 also uses a detachable seat, but swings the seat from an away facing attitude into the vehicle.

See also U.S. Pat. No. 5,207,549 issued on May 4, 1993; U.S. Pat. No. 4,457,663 issued on Jul. 3, 1984; and, U.S. Pat. No. 3,677,424 issued on Jul. 18, 1972.

However, such apparatus have been unduly complex and expensive; have required extensive modification of the vehicle; or, involved complicated time-consuming procedures.

U.S. Pat. No. 4,365,924 issued on Dec. 28, 1982 describes such apparatus mounted to the vehicle door, but this would load the door hinges excessively.

Accordingly, it is the object of the present invention to provide a transfer apparatus for moving persons from a wheelchair into the passenger compartment of an automobile which is compact and requires motions readily adapted to a sedan with only minimal adaptation.

Another object is to provide such apparatus which is simple and can be manufactured at low cost, and to be readily affordable to individuals.

SUMMARY OF THE INVENTION

The present invention comprises a transfer apparatus utilizing a detachable seat, and a swing arm pivotally mounted at one end to the vehicle floor pan at a forward location within the passenger compartment. The swing arm is not itself mounted to be raised, but rather an elevator mechanism comprised of a power screw is mounted at the outboard end of the swing arm, which engages the seat and elevates the same preparatory to inward swinging movement of the swing arm. The passenger seat mounting is modified to be retracted a slight additional distance over the conventional mounting to provide clearance as the detachable seat is swung over the passenger seat. The elevator mechanism is again operated to lower the detachable seat, which is decoupled from the arm at the same time to allow the passenger seat to be moved forward to a normal position, leaving the swing arm in a stowed position alongside the seat.

The elevator mechanism is preferably electrically operated, and a tethered switch assembly conventionally allows control over the operation of the elevator mechanism while the passenger is transferred by the apparatus.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
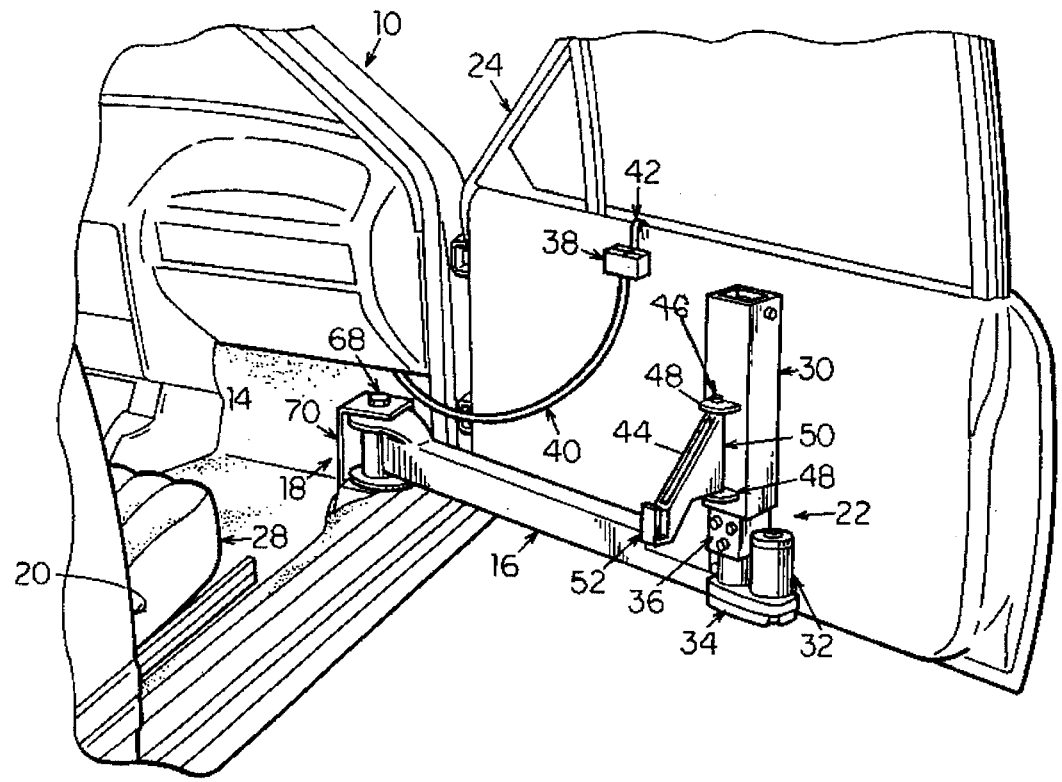
FIG. 1 is a perspective view of the apparatus according to the invention, shown without the detachable transfer seat and with the elevator mechanism in the lowered position, showing fragmentary portions of an automobile in which the apparatus is installed.

Referring to FIG. 1, the apparatus according to the present invention is shown installed in a sedan type automobile 10, enabling transfer of a person from a wheelchair (not shown) into the front passenger seat 28 within the passenger compartment 14 of the automobile 10.

The apparatus includes a swing arm 16 pivotally supported on its inboard end with a sturdy pivotal mounting 18, located on the floor at the forward part of the passenger compartment 14, adjacent the door opening 20.

The swing arm 16 is thereby able to be easily swung manually from a position extending alongside the inside of the closed passenger door 24, adjacent the seat 28 outwardly to the position shown when the door 24 is opened.

The swing arm 16 has an elevator mechanism 22 supported on its outboard unsupported end. The elevator mechanism 22 includes an outer square tube 30 driven up or down by operation of an electrical motor 32 by a reduction gearing unit 34 and a ball-screw unit 36.

Operation of the electrical motor 32 is selectively controlled by a tethered hand-held electrical switch 38 enabling up or down operation by reversing of the rotation of the electrical motor 32. The switch 38 is tethered by an electrical extension cord 40 connecting the switch to the electrical circuit, described in further detail hereinafter. The switch 38 is provided with a hook 42 allowing it to be conveniently hooked into the window opening of the door 24.

The square tube 30 has a support member 44 mounted thereon by a clevis pin 46 received through a pair of spaced fixed plates 48 and a tubular portion 50 of the support member 44.

Figure 4:
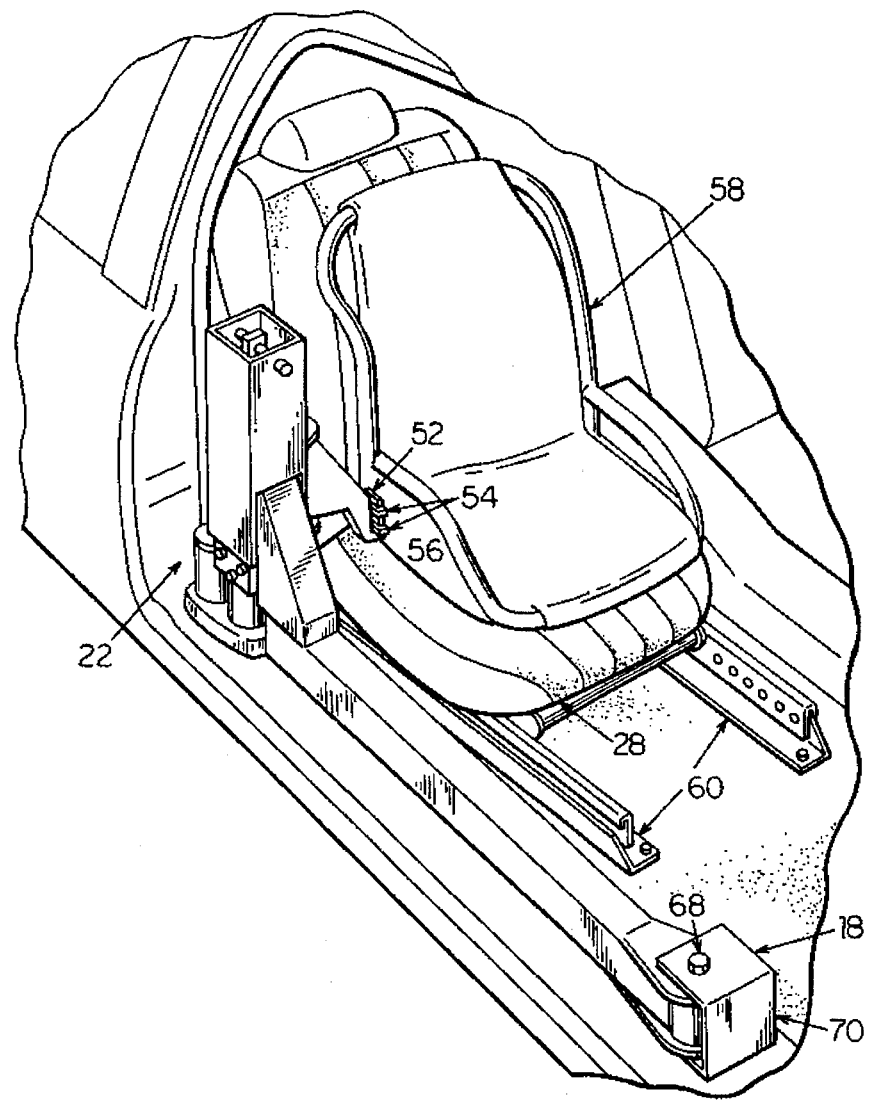
FIG. 4 is a perspective view of the apparatus with the transfer seat positioned over the passenger seat.

An upwardly projecting bar 52 is formed on the projecting end of the support member 44, adapted to engage a slot receptacle formed by one or more U-shaped loop projections 54 integral with a side panel 56 of a transfer seat 58 (FIG. 4).

The transfer seat 58 is adapted to support the person to be transferred on his or her wheelchair and also on the passenger seat 28 of the car.

The bar 52 is located to be below the height of the projections 54 with the seat 58 in place on the wheelchair and the elevator mechanism in the lowered condition.

Figure 1A:
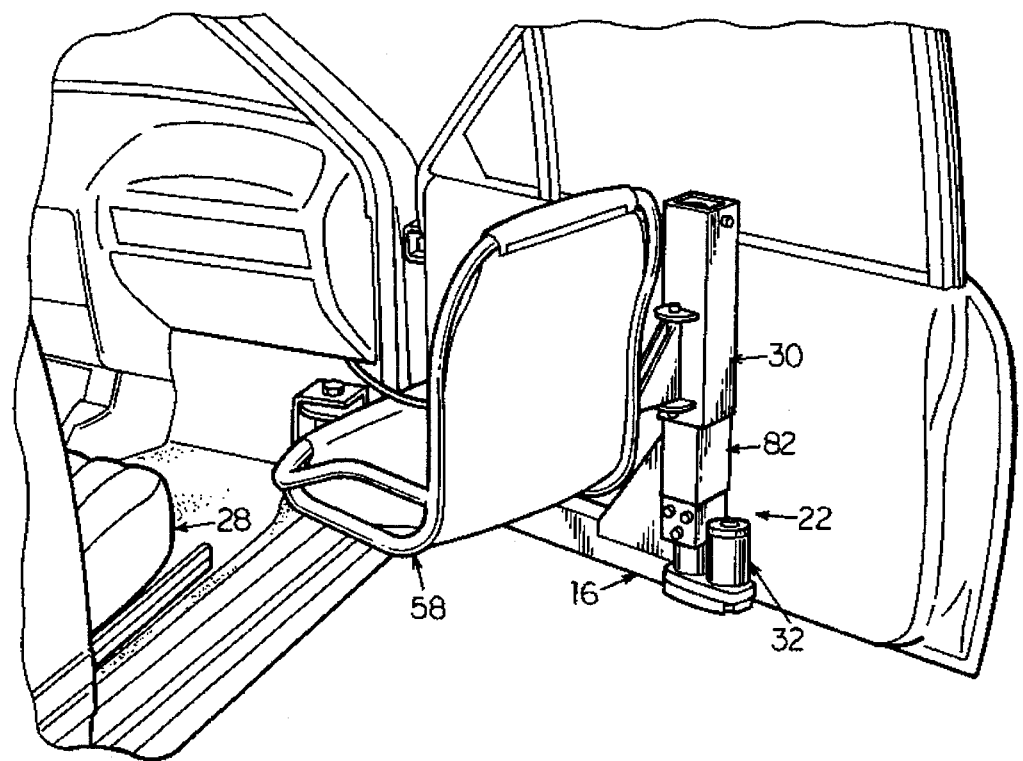
FIG. 1A is a perspective view of the apparatus shown in FIG. 1, but with the detachable transfer seat in position and raised by the elevator mechanism.
Figure 2:
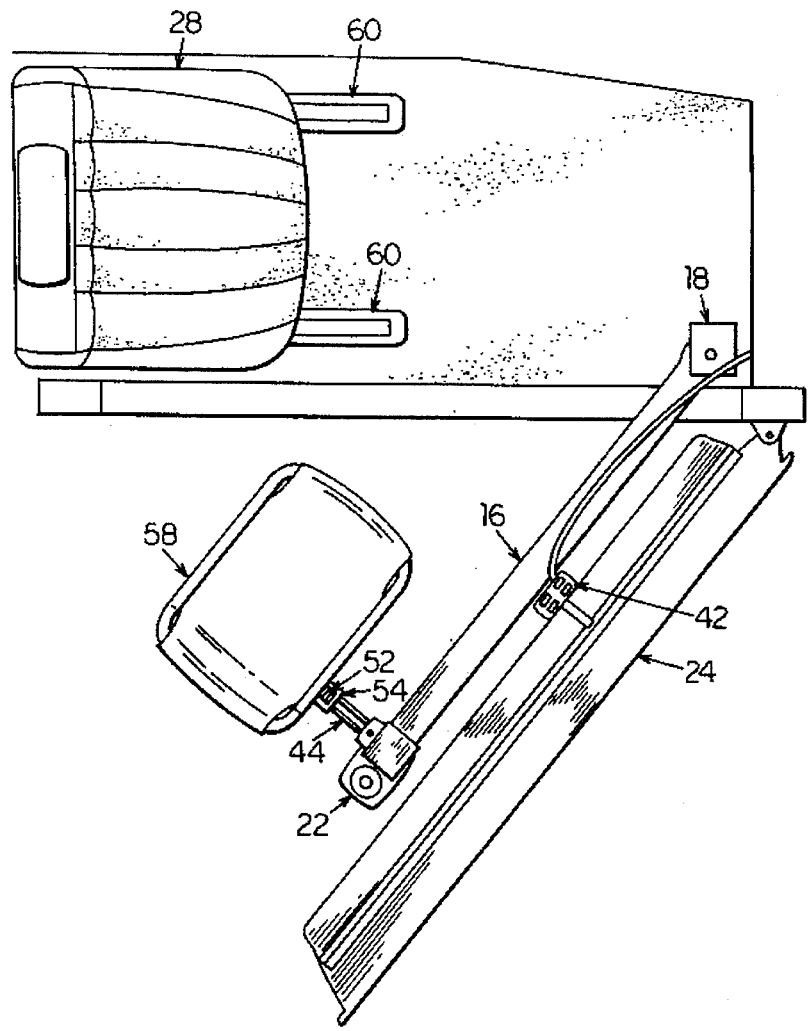
FIG. 2 is a plan view of the apparatus shown in FIG. 1A and a portion of the passenger compartment with the passenger seat retracted to allow a transfer seat to be swung over the same.

The wheelchair is maneuvered into position to align the slot formed by projections 54 with the bar 52, pivoting of tube 50 assisting in this effort, and the motor 32 operated to raise the transfer seat 58 off the wheelchair, as shown in FIGS. 1A and 2.

The swing arm 16 is swung inwardly to bring the transfer seat 58 over the passenger seat 28.

Figure 3:
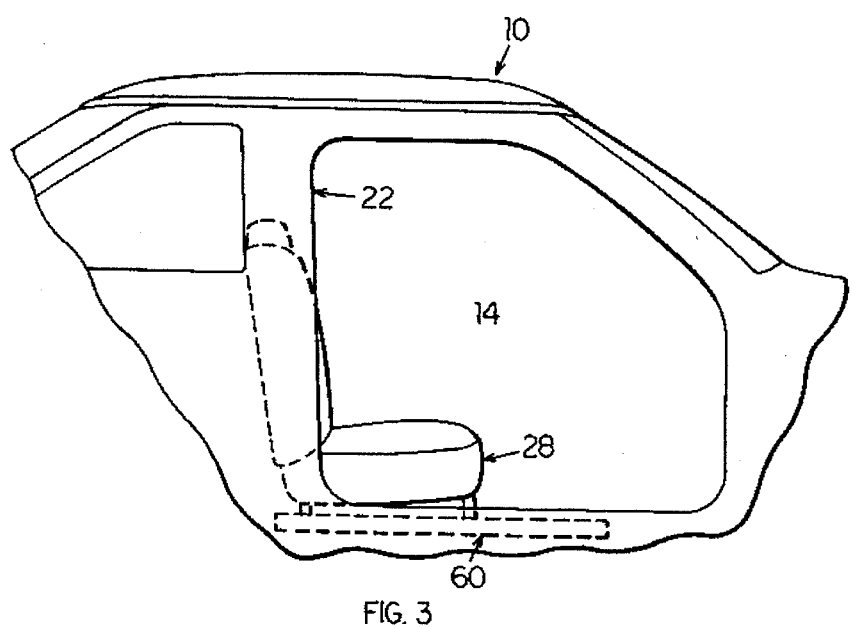
FIG. 3 is a side elevational view of the passenger seat and portions of the automobile showing the full retraction of the passenger seat.

Passenger seat 28 must be retracted behind the door opening 20 to allow this as shown in FIG. 3, and extra length seat tracks 60 may be installed for this purpose.

The seat 28 is preferably powered to facilitate seat retraction and forward movement.

As shown in FIG. 4, the transfer seat 58 is able to be positioned over the car seat 28, and the elevator mechanism 22 operated to lower the transfer seat 58 onto the car seat 28 and cause disengagement of the bar 52 from U-shaped loop projections 54. This allows the car seat 28 to be moved forwardly to a normal position, the swing arm 16 remaining in a stowed position extending alongside the closed door 24.

Figure 5:
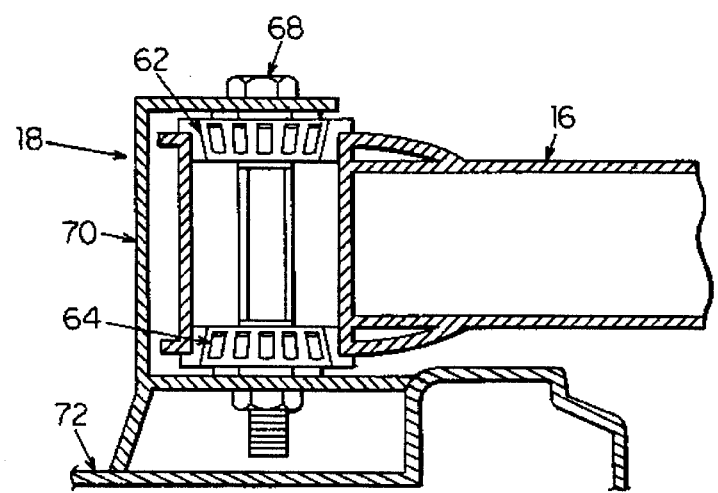
FIG. 5 is a partial section through the pivotal mount for the inboard end of the swing arm.
Figure 6:
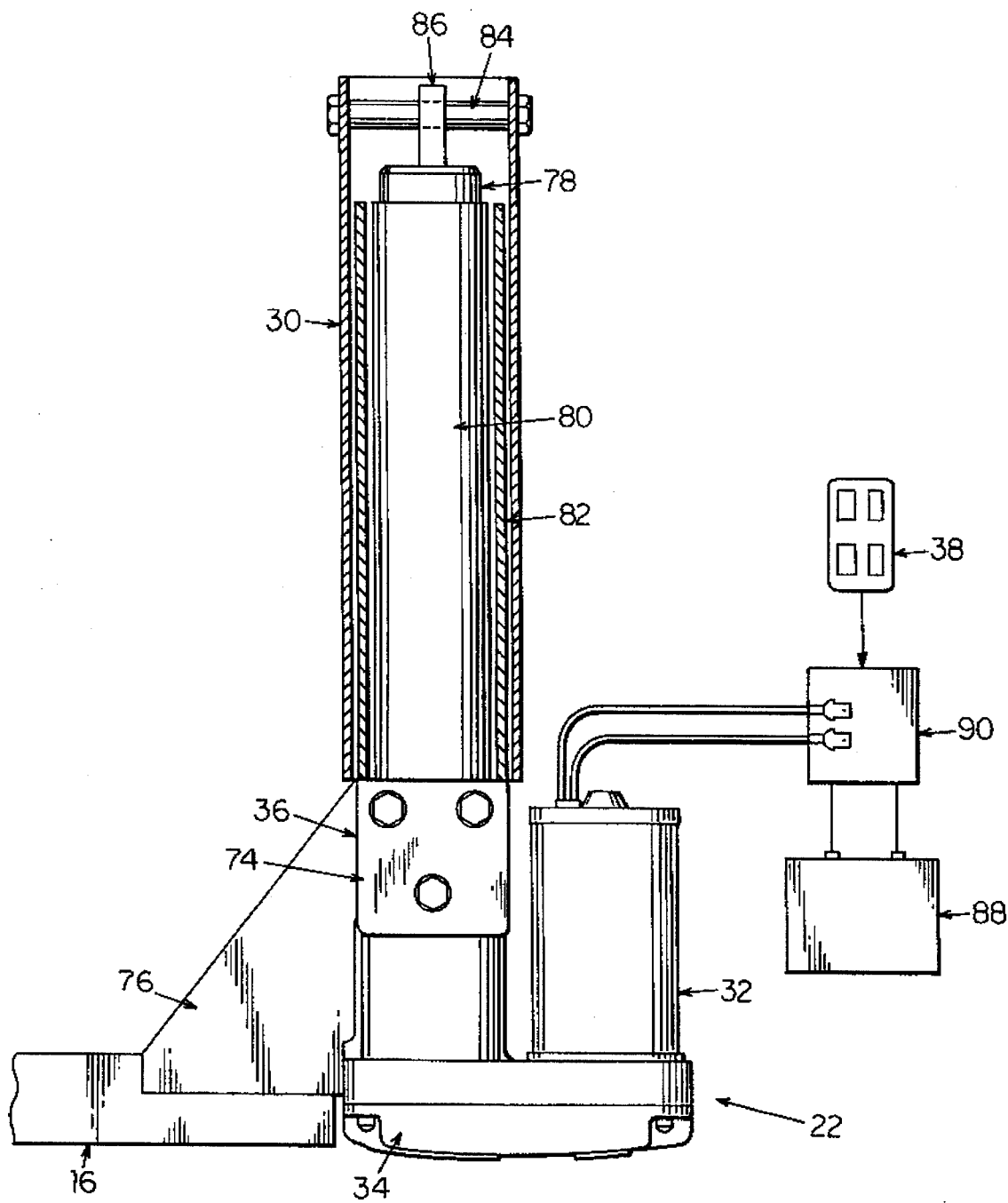
FIG. 6 is a partial section of the elevator mechanism at the outboard end of the swing arm, with a schematic representation of the associated electrical circuit.

FIGS. 5 and 6 show further details. The swing arm 16 is constructed as a square metal tube to have sufficient strength to support the cantilevered weight of the passenger transfer seat 58 and elevator mechanism 22. A pair of tapered roller bearings 62, 64 are carried in a journal end portions 66 of the swing arm 16.

An axle bolt 68 is carried by a weldment 70 welded to the vehicle floor pan 72 to provide the pivotal mount 18.

FIG. 6 shows additional details of the elevator mechanism 22 and electrical power circuit for controlling the motor 32.

A housing 74 is attached to the outboard end of the swing arm 16, as with a welded gusset plate 76.

The standard commercial ball screw unit 36 includes an output shaft 78 protruding from a cylinder 80 disposed within a guide tube 82 intermediate the square outer tube 30 and cylinder 80. The output shaft 78 is connected to the upper end of the square tube 30 with a cross pin 84 passing through a clevis end 86.

Gear unit 34 connects housing 74 and electrical motor 32.

Power to the motor 32 from the vehicle battery 88 is controlled with the switch 38 by means of an intermediate relay 90. The various wire leads can be routed through the hollow swing arm 16.

Accordingly, the present invention provides a relative compact transfer apparatus adapted to be used with relatively small vehicles, and not limited to oversize vehicles such as vans, buses, etc.

At the same time, only low cost components are required, i.e., standard commercial items such as bearings and a ball screw, and simple weldments so that the apparatus can be manufactured at low cost.

Only minor modifications to the vehicle are required.

We claim:

1. Transfer apparatus for transferring a person from a wheelchair onto a passenger seat in a passenger compartment of an automotive vehicle, said apparatus comprising:

an elongated swing arm pivotally mounted at one end at a a floor of said passenger compartment, forward and to the outside of said passenger seat, said swing arm having a length to be able to be disposed in an inward position extending from said forward location rearwardly alongside said passenger seat, said swing arm swingable on said pivotal mounting outward through a vehicle door opening located alongside said passenger seat, from said position extending back alongside said passenger seat;

an elevator mechanism at an outboard free end of said swing arm, said elevator mechanism including an engagement element, and a selectively operable power drive able to elevate said engagement element;

a transfer seat detachable from said swing arm free end and adapted to rest on a wheelchair, said transfer seat having an element engageable with said elevator engagement element when said swing arm is swung out to align said respective elements, said engagement carried out upon operation of said elevator mechanism to enable lifting said transfer seat from a wheelchair;

said swing arm able to swing back within said door opening to said inward position so as to bring said transfer seat over said passenger seat when said transfer seat has been previously elevated by said elevator mechanism, and said elevator mechanism thereafter operable to lower said transfer seat onto said passenger seat.

2. The transfer apparatus according to claim 1 wherein said vehicle door opening has a rear edge and said passenger seat is mounted to be retractable to bring a back portion thereof to a rearward position with respect to the rear edge of said vehicle door opening to provide clearance for said transfer seat in being swung over said passenger seat.

3. The transfer apparatus according to claim 1 wherein said swing arm is comprised of a single hollow steel tube cantilevered from said pivotal mounting at said one end.

4. The transfer apparatus according to claim 1 wherein said elevator mechanism comprises a ball screw unit having an output shaft and also includes an outer tube having said engagement element affixed thereto.

5. The transfer apparatus according to claim 1 wherein said elevator mechanism includes an electric drive motor, and also includes a control switch tethered on an electrical extension line selectively operable to cause raising and lowering of said engageable element.

6. The transfer apparatus according to claim 1 wherein said engageable element comprises an upwardly projecting bar and said transfer seat has a slot receiving said bar when said elevator mechanism is operated, and disengaging therefrom upon lowering said transfer seat onto said passenger seat.

* * * * *